D. MACK.
Garden-Cultivating Implements.
No. 144,912.     Patented Nov. 25, 1873.
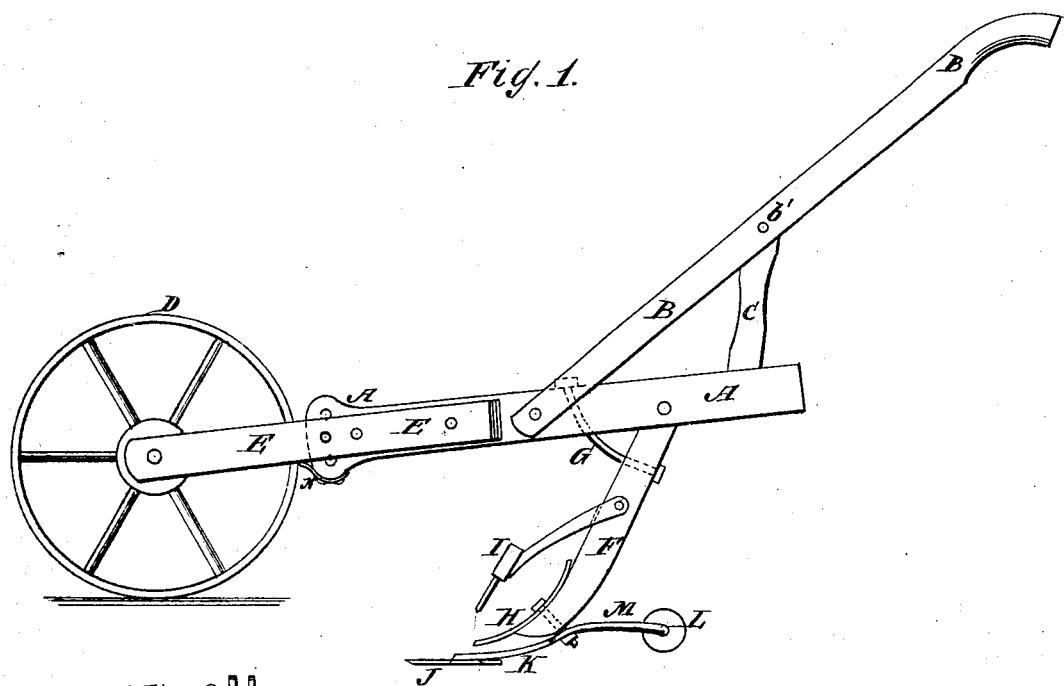
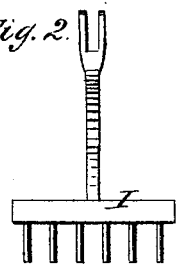
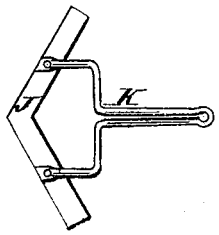

UNITED STATES PATENT OFFICE.

DAVID MACK, OF BARNESVILLE, KANSAS.

IMPROVEMENT IN GARDEN-CULTIVATING IMPLEMENTS.

Specification forming part of Letters Patent No. 144,912, dated November 25, 1873; application filed June 28, 1873.

*To all whom it may concern:*

Be it known that I, DAVID MACK, of Barnesville, in the county of Bourbon and State of Kansas, have invented a new and useful Improvement in Garden-Cultivating Implement, of which the following is a specification:

Figure 1 is a side view of my improved plow and its attachments. Fig. 2 is a detail view of the rake. Fig. 3 is a detail view of the weed-cutter.

Similar letters of reference indicate corresponding parts.

My invention is an improved implement for use of gardeners, nursery-men, &c., for cultivating various plants by hand. It includes a shovel or plow, rake, weed-cutter, clod-breaking roller, and an adjustable transporting-wheel, as hereinafter described.

A is the plow-beam, to which are attached the handles B, the same being connected and supported in the usual way by the round $b'$ and upright C. D is a wheel, whose bearings are in the forward ends of the bars E. The latter are secured adjustably to the opposite sides of the forward end of the beam A, several holes being formed for the connecting-bolts, so that the pitch of the handles B may be readily adjusted to adapt the machine to be used by a tall or short person, as may be desired, and for another purpose which will be hereinafter specified. N is a plate, arranged to scrape the wheel D. F is the plow-standard, and G the brace-rod therefor. By adjusting the nut on the upper end of the brace-rod the pitch of the standard F may be adjusted to any desired extent. The plow H is made double, one end being made small and the other large, so that one or the other end may be used, according as the work to be done may require. I is the rake, the forked shank of which is bolted to the standard F. The blade J of the weed-cutter is made V-shaped, and is secured to the ends of the arms of the shank K, which is, in turn, secured to the standard F by the same bolt that secures the plow H. The same means secure the roller L by its shank M.

The function of the rake is to clear the surface of vines, weeds, &c., whose roots or stems may have been severed by the cutter J. The roller L is used with the weed-cutter and rake, principally for the purpose of preventing the former entering the earth too far or sustaining too much of the weight of the frame of the implement. Thus the roller and the wheel D are indispensable co-operators with the weed-cutter and rake in their operation. The shovel H is detached when weed-cutter is used, or else turned so as to be crosswise of the standard F. Similarly the weed-cutter is detached when the shovel is used.

I do not claim the combination of a front and rear supporting-wheel with a cultivating implement; but

I claim—

The combination of wheel D, jointed beam E A, rear roller L, and standard F, with horizontal weed-cutter J and rearward-superposed rake I, as and for the purpose described.

DAVID MACK.

Witnesses:
E. H. HOOKER,
L. H. TIFFANY.